Patented Dec. 11, 1928.

1,694,680

UNITED STATES PATENT OFFICE.

EDWARD F. BURTON AND JAY H. MONTGOMERY, OF LOS ANGELES, CALIFORNIA, ASSIGNORS TO HONEY-BUTTER COMPANY, OF LOS ANGELES, CALIFORNIA, A CORPORATION OF CALIFORNIA.

FOOD PRODUCT AND PROCESS OF PRODUCING THE SAME.

No Drawing. Application filed July 12, 1926, Serial No. 122,036. Renewed August 8, 1928.

This invention relates to a novel food product and to a process of producing the same.

Heretofore, honey such as bees' honey, has been recognized as a highly valuable food but its use has been considerably limited by the physical form of the natural honey. Usually honey is used together with butter but the two natural products do not unite readily when mixed together. It is an object of the present invention to provide a product containing butter and a substantial quantity of honey united in solid form.

More particularly, an object of the present invention is to provide a homogeneous compound of honey and butter which possesses substantially the physical properties of hardness and texture of butter so that it may be readily packed and handled without the usual inconvenience experienced in handling or using honey.

We have discovered that butter in the solid state can be emulsified with honey in syrup form in the presence of a water miscible colloidal agent to produce a product of approximately the same physical properties as butter, which product will retain the natural flavor of a mixture of honey and butter.

This invention, together with various objects and advantages thereof will be readily understood from a description of a preferred form of product embodying the invention and from a preferred process of producing the product. We, therefore, will describe in considerable detail one example of a process and product embodying the present invention.

The product of the present invention consists preferably of but three ingredients, (1) honey in syrup form, (2) sweet butter, and (3) a water miscible colloidal material which operates as an emulsifying agent of the first two ingredients. The term "honey" is employed in the sense of including any material of the properties of natural bees' honey in syrup form whether the natural material is used or one artificially produced to simulate the properties of the natural honey, for example, raisin syrup, and similar sugar syrups. Similarly, the term "butter" herein is used to include butter substitutes, such as oleo, oleomargarine, and like materials. The colloidal material or emulsifying agent may be any of a number of materials, it being understood, however, that one suitable as a food product should be employed. Examples of such materials are pectin, egg albumen, agar, gum arabic, gum tragacanth, and gelatin.

The proportions of materials employed are not particularly critical. We have found, for example, that a composition containing equal parts honey and butter, and 1 per cent emulsifying agent, is suitable. The emulsifying agent preferably is added in quantities of less than 2 per cent. Egg albumen or white of an egg has been found to be the preferred blending or emulsifying agent.

In the manufacture of the compound, it is found that considerable care must be taken in order to maintain the butter in the solid state throughout the process. If once the butter is melted, it appears extremely difficult to secure the proper product. Accordingly, in the manufacture of the product, the constituents in suitable proportions are admixed together at a temperature not higher than the melting point of the butter, preferably below 70° F. The honey and butter are mixed together by slowly agitating the same and then the blending agent or emulsifying agent is added and the ingredients placed in a rotary mixing machine operated, for example, at a speed of approximately 200 revolutions per minute. The ingredients are maintained in the rotary machine subject to this agitation for a period of approximately an hour or sufficient time to form a substantially homogeneous mixture, during which time the temperature is kept close to 60° F., or at least below that temperature at which the butter melts.

The product produced is of approximately the consistency of ordinary commercial butter and may be handled in the same manner. It, however, possesses all of the taste of mixtures of ordinary honey and butter and may be used for the same purposes.

While the form of the invention herein described is well adapted for carrying out the objects of the present invention, it is understood that various modifications and changes may be made without departing from the invention as included in the appended claims.

We claim:

1. A process of making a homogeneous emulsion of butter and honey, which comprises admixing butter and honey in syrup form together, adding a blending agent, and agitating the ingredients together until a homogeneous solid mass is obtained, the ingredients being maintained at a temperature below the melting point of the butter throughout the process.

2. A food product comprising butter, honey in syrup form, and egg albumen emulsified together to form a product of substantially the consistency of butter.

3. A food product comprising a butter, a honey syrup, and a binding agent, the ingredients being emulsified together into a solid state to form a homogeneous mass of substantially the consistency of commercial butter.

Signed at Los Angeles, California, this 30 day of June 1926.

EDWARD F. BURTON.
JAY H. MONTGOMERY.